(12) United States Patent
Zhan et al.

(10) Patent No.: US 11,274,203 B2
(45) Date of Patent: Mar. 15, 2022

(54) PROCESS FOR THE PREPARATION OF TPU ALLOY BY IN-SITU REACTIVE COMPATIBILITY TECHNOLOGY

(71) Applicant: Miracll Chemicals Co., Ltd., Shandong (CN)

(72) Inventors: Zhensheng Zhan, Shandong (CN); Hongwei Song, Shandong (CN); Qingbo Zhao, Shandong (CN); Sheng Zhang, Shandong (CN); Guanglei Ren, Shandong (CN)

(73) Assignee: Miracll Chemicals Co., Ltd., Shandong (CN)

( * ) Notice: Subject to any disclaimer, the term of this patent is extended or adjusted under 35 U.S.C. 154(b) by 124 days.

(21) Appl. No.: 16/477,894

(22) PCT Filed: Feb. 24, 2017

(86) PCT No.: PCT/CN2017/074659
§ 371 (c)(1),
(2) Date: Jul. 14, 2019

(87) PCT Pub. No.: WO2018/133157
PCT Pub. Date: Jul. 26, 2018

(65) Prior Publication Data
US 2020/0123380 A1    Apr. 23, 2020

(30) Foreign Application Priority Data
Jan. 23, 2017 (CN) .......................... 201710058676.X

(51) Int. Cl.
*C08L 75/06* (2006.01)
*B01J 2/20* (2006.01)

(52) U.S. Cl.
CPC .................. *C08L 75/06* (2013.01); *B01J 2/20* (2013.01); *C08L 2201/08* (2013.01)

(58) Field of Classification Search
CPC ................................................ C08L 75/04–10
See application file for complete search history.

(56) References Cited

U.S. PATENT DOCUMENTS

| | | | | |
|---|---|---|---|---|
| 5,539,054 | A | * | 7/1996 | LaFleur .................. C08L 75/04 525/125 |
| 2003/0083434 | A1 | * | 5/2003 | Ouhadi .................... C08L 23/16 525/80 |
| 2010/0222524 | A1 | * | 9/2010 | Lawrey ................. C08G 18/664 525/457 |
| 2016/0272813 | A1 | * | 9/2016 | Wiederhirn ......... C08G 18/4854 |

OTHER PUBLICATIONS

Espacenet translation of CN 104045964 (Year: 2021).*
Espacenet translation of CN 103497429 (Year: 2021).*

* cited by examiner

*Primary Examiner* — Michael M Dollinger
(74) *Attorney, Agent, or Firm* — Liang Legal Group, PLLC

(57) ABSTRACT

A process for preparing a TPU alloy material through in-situ compatibilization includes: 1) adding a premixed TPU raw material to a feeding port of a twin-screw extruder; injecting a mixture of an alloy component and a dual-active substance into the twin-screw extruder through a lateral feeding port; adding an auxiliary reagent to the TPU raw material or the mixture of the alloy component and the dual-active substance, wherein the alloy component is a polyolefin or a thermoplastic polymer material having reactivity, wherein the dual-active substance is a substance containing a group reactive with the TPU raw material and a group reactive with the alloy component, and the auxiliary reagent includes an initiator; 2) controlling a temperature of a reaction zone of the twin-screw extruder at 50° C. to 250° C., and granulating an extruded material by underwater cutting; and 3) drying the granulated product to obtain the TPU alloy material.

11 Claims, No Drawings

PROCESS FOR THE PREPARATION OF TPU ALLOY BY IN-SITU REACTIVE COMPATIBILITY TECHNOLOGY

TECHNICAL FIELD

The present invention relates to a TPU material and a preparation process thereof, in particular to a TPU alloy material and a preparation process thereof, and belongs to the technical field of polymeric materials.

BACKGROUND ART

A thermoplastic polyurethane elastomer (TPU) is a type of polyurethane that can be plasticized by heating with no or little chemical cross-linking in the chemical structure, and has high strength, high modulus, better elasticity, excellent wear resistance, and good oil resistance in a wide range of hardness. TPU can generally be used to improve the performances of other materials due to its excellent elasticity, wear resistance, and the like.

However, when a thermoplastic polyurethane elastomer (TPU) is modified with polypropylene (PP), SEBS, EVA, ethylene-octene copolymer (POE), and the like, there is a problem of poor compatibility, and a compatibilizer is required. A general method comprises synthesizing TPU first; grafting a modified material with a compatibilizer, such as SEBS-g-MAH, EVA-g-MAH or POE-g-MAH; mixing the modified material and TPU uniformly in a high-speed mixer; and then extruding through a twin-screw extruder followed by granulation. Since the compatibilizer generally has a low grafting ratio and is physically compatible, a relatively large amount of compatibilizer is generally required to obtain a relatively good effect. Meanwhile, the requirements on the production process and equipment are relatively high.

SUMMARY OF INVENTION

In view of the shortcomings in the methods for preparing existing TPU modified materials, the present invention provides a process for preparing a TPU alloy material by in-situ compatibilization.

A technical solution of the present invention for solving the above technical problems is as follows:

A process for preparing a TPU alloy material through in-situ compatibilization, comprises the following steps:

1) adding premixed 100 parts by weight of TPU raw material into a feeding port of a twin-screw extruder; adding 5 to 95 parts by weight of an alloy component and 0.1 to 10 parts by weight of a dual-active substance into the twin-screw extruder through a lateral feeding port without a particular order for either of them; adding 0.1 to 5 parts by weight of an auxiliary reagent to the TPU raw material or the mixture of the alloy component and the dual-active substance, wherein the alloy component is one of a polyolefin material and a thermoplastic polymer material having reactivity, wherein the dual-active substance is a substance containing a group reactive with the TPU raw material and a group reactive with the alloy component, and wherein the auxiliary reagent comprises an initiator;

2) controlling a temperature of a reaction zone of the twin-screw extruder at 50° C. to 250° C., and granulating the extruded material by underwater cutting; and 3) drying the granulated product obtained in step 2) to obtain the TPU alloy material.

In further embodiments, the dual-active substance is a compound containing one or more of an anhydride group, carboxyl (—COOH), hydroxyl (—OH), amino (—NH or —NH$_2$), an isocyanate group (—NCO), and an epoxy group.

In further embodiments, the dual-active substance is one of maleic anhydride, glycidyl methacrylate, acrylic acid, methyl methacrylate, butyl acrylate, acrylamide, allyl polyethylene glycol, amino acid, and epoxy resin.

In further embodiments, the thermoplastic polymer material having reactivity refers to one of polyamide, ABS resin, Thermoplastic elastomers (TPE), and polyacrylate.

In further embodiments, the polyolefin material is one of Styrene Ethylene Butylene Styrene (SEBS), Poly (styrene-butadiene-styrene) (SBS), polypropylene (PP), polyethylene (PE), ethylene-vinyl acetate (EVA), polyolefin elastomer (POE), and ethylene propylene diene monomer rubber (EPDM).

In further embodiments, the TPU raw material comprises a polymeric polyol, a chain extender, and an isocyanate.

In further embodiments, the polymeric polyol is one or more of a polyester polyol, a polyether polyol, and a hydroxyl terminated polybutadiene diol, and the chain extender is a small molecule diol or diamine having 12 carbon atoms or fewer.

In further embodiments, the chain extender is one or more of ethylene glycol, 1,3-propanediol, 1,3-butanediol, 1,4-butanediol, 1,6-hexanediol, 1,4-cyclohexanedimethanol, diethylene glycol, triethylene glycol, neopentyl glycol, and dipropylene glycol; the isocyanate is one or more of toluene diisocyanate (TDI), diphenylmethane diisocyanate (MDI), hexamethylene diisocyanate (HDI), dicyclohexylmethane diisocyanate (H12MDI), isophorone diisocyanate (IPDI), and xylylene diisocynate (XDI).

In further embodiments, the auxiliary reagent further comprises an antioxidant, a lubricant, and an UV-resistant additive.

In further embodiments, a rotation speed of the screw extruder in step 2) is controlled at 80 rpm to 400 rpm, and a temperature in a cooling zone is controlled at 90° C. to 110° C.

The present invention may include one or more of the following beneficial effects:

1) The TPU and the alloy materials are linked with chemical bonds using dual-active substances, thereby overcoming the compatibility problem between the TPU and the alloy materials, such that the products not only have excellent mechanical properties, wear-resisting properties, chemical resistance, high/low temperature resistance (tolerance), easy processing properties, and other performances of the TPU materials, but also can improve the binding performance with other materials, and thus the performances of the final product can be improved.

2) The synthesis of TPU, the in-situ compatibilization using the dual-active substance, and the mixing of the TPU and the alloy material are all achieved in one step in the twin-screw reaction extrusion process. Therefore, the production process is simplified.

DETAILED DESCRIPTION

The principles and features of the present invention are described below in conjunction with the following examples, which are merely intended to illustrate the invention and are not intended to limit the scope of the present invention.

EXAMPLE 1

A process for preparing a TPU alloy material through in-situ compatibilization comprises the following steps:

1) pre-mixing 68 parts of polyester polyol having a molecular weight of 2000 g/mol, 6 parts of butanediol (BDO), and 26 parts of diphenylmethane diisocyanate (MDI) in a reaction kettle; then adding the mixture to a feeding port of a twin-screw extruder; and injecting 95 parts of SEBS (YH-503T from Yueyang Petrochemical, Yueyang, Hunan, China), 10 parts of MAH (maleic anhydride), and 0.1 part of the initiator DCP (dicumyl peroxide) into the twin-screw extruder through a lateral feeding port;

2) controlling a temperature of a reaction zone of the twin-screw extruder to be at 140° C. to 200° C., and a temperature of a cooling zone to be at 90° C. to 110° C., and then granulating/pelletizing the extruded material by underwater cutting (wet cut strand pelletizing); and 3) drying the granulated product obtained in step 2) to obtain the TPU alloy material.

The TPU modified material prepared in this Example has a hardness of 75 A, a tensile strength of 10.2 MPa, a DIN abrasion of 55 mm$^3$ and a ball rebound of 55%.

EXAMPLE 2

A process for preparing a TPU alloy material through in-situ compatibilization comprises the following steps:

1) adding 0.3 part of Irganox® 1010 (BASF Corp), 0.2 part of Irganox® 1076 (BASF Corp), 0.5 part of Tinuvin® B900 (BASF Corp), 0.3 part of E wax (emulsifying wax), and 0.2 part of oleylamide (oleamide) to a mixture of 55 parts of polyester polyol having a molecular weight of 1500 g/mol, 7 parts of BDO, and 38 parts of diphenylmethane diisocyanate (MDI), and pre-mixing the mixture in a reaction kettle, then adding the mixture to a feeding port of a twin-screw extruder, and injecting 75 parts of SEBS (G1650 from Kraton Corp., Houston, Tex.), 5 parts of MAH (maleic anhydride) and 0.2 part of the initiator DCP (dicumyl peroxide) into the twin-screw extruder through a lateral feeding port;

2) controlling a temperature of a reaction zone of the twin-screw extruder to be at 50° C. to 250° C., and a temperature of a cooling zone to be at 90° C. to 110° C., and then granulating the extruded material by underwater cutting (wet cut pelletizing); and 3) drying the granulated product obtained in step 2) to obtain the TPU alloy material.

The TPU modified material prepared in this Example has a hardness of 82 A, a tensile strength of 9.9 MPa, a DIN abrasion of 43 mm$^3$ and a ball rebound of 50%.

EXAMPLE 3

A process for preparing a TPU alloy material through in-situ compatibilization comprises the following steps:

1) adding 0.3 part of Irganox® 1010, 0.1 part of Irganox® 1076, 0.7 part of Tinuvin® B900, 0.2 part of octadecanamide, and 0.4 part of EBS to 70 parts of polyester polyol having a molecular weight of 1800 g/mol, and then pre-mixing with 5 parts of BDO and 25 parts of toluene diisocyanate (TDI) in a reaction kettle; then adding the mixture to a feeding port of a twin-screw extruder; and injecting 65 parts of EVA (Evaflex® 150Y from Mitsui Chemicals), 0.1 part of acrylic acid, and 0.1 part of the initiator DCP (dicumyl peroxide) into the twin-screw extruder through a lateral feeding port;

2) controlling a temperature of a reaction zone of the twin-screw extruder to be at 140° C. to 180° C., and a temperature of a cooling zone to be at 90° C. to 110° C., and then granulating the extruded material by underwater cutting; and 3) drying the granulated product obtained in step 2) to obtain the TPU alloy material.

The TPU modified material prepared in this Example has a hardness of 81 A, a tensile strength of 12.9 MPa, a DIN abrasion of 66 mm$^3$ and a ball rebound of 53.9%.

EXAMPLE 4

A process for preparing a TPU alloy material through in-situ compatibilization comprises the following steps:

1) adding 0.35 part of Irganox® 1010, 0.2 part of Irganox® 1098, 0.2 part of Tinuvin® 770, 0.4 part of Chimassorb® 2020 (BASF), 0.4 part of oleylamide, and 0.1 part of octadecanamide to 45 parts of polyester polyol having a molecular weight of 1000 g/mol, then pre-mixing the resulting mixture with 8 parts of BDO and 47 parts of toluene diisocynate (TDI) in a reaction kettle; then adding the mixture to a feeding port of a twin-screw extruder; and injecting 34 parts of POE (8130 from Dow Chemicals), 0.5 part of acrylamide, and 0.15 part of the initiator DCP (dicumyl peroxide) into the twin-screw extruder through a lateral feeding port;

2) controlling a temperature of a reaction zone of the twin-screw extruder to be at 140° C. to 170° C., and a temperature of a cooling zone to be at 90° C. to 110° C., and then granulating the extruded material by underwater cutting; and 3) drying the granulated product obtained in step 2) to obtain the TPU alloy material.

The TPU modified material prepared in this Example has a hardness of 79 A, a tensile strength of 7.6 MPa, a DIN abrasion of 44.2 mm$^3$ and a ball rebound of 59.1%.

EXAMPLE 5

A process for preparing a TPU alloy material through in-situ compatibilization comprises the following steps:

1) adding 0.35 part of Irganox® 1010, 0.2 part of Irganox® 1098, 0.3 part of Tinuvin® 770, 0.2 part of Chimassorb® 2020, 0.4 part of oleylamide, and 0.1 part of octadecanamide to 45 parts of polyester polyol having a molecular weight of 1800 g/mol, then pre-mixing the resulting mixture with 8 parts of BDO and 47 parts of hexamethylene diisocyanate (HDI) in a reaction kettle, then adding the mixture to a feeding port of a twin-screw extruder, and injecting 45 parts of POE (8130 from Dow Chemicals), 1.5 parts of acrylamide and 0.25 part of the initiator DCP (dicumyl peroxide) into the twin-screw extruder through a lateral feeding port;

2) controlling a temperature of a reaction zone of the twin-screw extruder to be at 140° C. to 170° C., and a temperature of a cooling zone to be at 90° C. to 110° C., and then granulating the extruded material by underwater cutting; and 3) drying the granulated product obtained in step 2) to obtain the TPU alloy material.

The TPU modified material prepared in this Example has a hardness of 73 A, a tensile strength of 13.4 MPa, a DIN abrasion of 56.1 mm$^3$ and a ball rebound of 53.1%.

EXAMPLE 6

A process for preparing a TPU alloy material through in-situ compatibilization comprises the following steps:

1) adding 0.55 part of Irganox® 1010, 0.2 part of Irganox® 1098, 0.25 part of Tinuvin® 770, 0.5 part of Chimassorb® 2020, 0.4 part of oleylamide and 0.1 part of octadecanamide to 45 parts of polyester polyol having a molecular weight of 1800 g/mol, then pre-mixing the resulting mixture with 8 parts of BDO and 47 parts of hexamethylene diisocyanate (HDI) in a reaction kettle, then adding the mixture to a feeding port of a twin-screw extruder, and injecting 5 parts of polyamide, 0.1 part of methyl methacrylate and 1 part of the initiator DCP (dicumyl peroxide) into the twin-screw extruder through a lateral feeding port;

2) controlling a temperature of a reaction zone of the twin-screw extruder to be at 140° C. to 170° C., and a temperature of a cooling zone to be at 90° C. to 110° C., and then granulating the extruded material by underwater cutting; and 3) drying the granulated product obtained in step 2) to obtain the TPU alloy material.

The TPU modified material prepared in this Example has a hardness of 78 A, a tensile strength of 13.4 MPa, a DIN abrasion of 56.1 $mm^3$ and a ball rebound of 52.9%.

EXAMPLE 7

A process for preparing a TPU alloy material through in-situ compatibilization comprises the following steps:

1) adding 0.55 part of Irganox® 1010, 0.2 part of Irganox® 1098, 0.25 part of Tinuvin® 770, 0.5 part of Chimassorb® 2020, 0.4 part of oleylamide and 0.1 part of octadecanamide to 45 parts of polyester polyol having a molecular weight of 1800 g/mol, then pre-mixing the resulting mixture with 8 parts of BDO and 47 parts of hexamethylene diisocyanate (HDI) in a reaction kettle, then adding the mixture to a feeding port of a twin-screw extruder, and injecting 75 parts of ABS resin, 6 parts of butyl acrylate, and 1 part of the initiator DCP (dicumyl peroxide) into the twin-screw extruder through a lateral feeding port;

2) controlling a temperature of a reaction zone of the twin-screw extruder to be at 140° C. to 170° C., and a temperature of a cooling zone to be at 90° C. to 110° C., and then granulating the extruded material by underwater cutting; and 3) drying the granulated product obtained in step 2) to obtain the TPU alloy material.

The TPU modified material prepared in this Example has a hardness of 78 A, a tensile strength of 13.4 MPa, a DIN abrasion of 56.1 $mm^3$ and a ball rebound of 52.9%.

EXAMPLE 8

A process for preparing a TPU alloy material through in-situ compatibilization comprises the following steps:

1) adding 0.55 part of Irganox® 1010, 0.2 part of Irganox® 1098, 0.25 part of Tinuvin® 770, 0.5 part of Chimassorb® 2020, 0.4 part of oleylamide, and 0.1 part of octadecanamide to 45 parts of polyester polyol having a molecular weight of 1800 g/mol, then pre-mixing the resulting mixture with 8 parts of BDO and 47 parts of hexamethylene diisocyanate (HDI) in a reaction kettle, then adding the mixture to a feeding port of a twin-screw extruder, and injecting 25 parts of TPE, 2 parts of epoxy resin and 0.8 part of the initiator DCP (dicumyl peroxide) into the twin-screw extruder through a lateral feeding port;

2) controlling a temperature of a reaction zone of the twin-screw extruder to be at 140° C. to 170° C., and a temperature of a cooling zone to be at 90° C. to 110° C., and then granulating the extruded material by underwater cutting; and 3) drying the granulated product obtained in step 2) to obtain the TPU alloy material.

The TPU modified material prepared in this Example has a hardness of 82 A, a tensile strength of 13.3 MPa, a DIN abrasion of 56.1 $mm^3$ and a ball rebound of 53.5%.

The TPU alloy material obtained in Example 3 is used in EVA foaming process to obtain an EVA foamed material. This EVA foamed material is compared with an EVA foamed material obtained by separately using TPU and EVA-g-MAH, and the results are shown in Table 1.

TABLE 1

Performance test data of an EVA foam material obtained by a process of the present invention and that obtained by a traditional process

| | Unit | Example 3 | Traditional Process |
|---|---|---|---|
| Tensile strength | MPa | 8.4 | 6.1 |
| Tear strength | KN/m | 13.2 | 10.2 |
| Ball rebound | % | 69.2 | 63.6 |
| Compression set | % | 26.3 | 33.2 |

As can be seen from the data in Table 1, the EVA foamed material obtained with a TPU material of the present invention has a tensile strength increased by 2.3 MPa, a tear strength increased by 3 KN/m, a ball rebound may be increased by 5.6%, and a compression set reduced by 6.9%. It can be seen from the data that processes of the present patent have clear advantages in improving the performances of the final products, as compared with the traditional process.

The above contents are merely preferred examples of the present invention and are not intended to limit the scope of the present invention. Any modification, equivalent displacement, improvement and the like, which fall within the spirit and principle of the present invention, should be included in the protection scope of the present invention.

The invention claimed is:

1. A process for preparing a thermoplastic polyurethane (TPU) alloy material through in-situ compatibilization, comprising:

1) adding premixed 100 parts by weight of unreacted TPU raw material to a feeding port of a twin-screw extruder; injecting a mixture of 5 to 95 parts by weight of an alloy component and 0.1 to 10 parts by weight of a dual-active substance into the twin-screw extruder through a lateral feeding port; adding 0.1 to 5 parts by weight of an auxiliary reagent to the unreacted TPU raw material or the mixture of the alloy component and the dual-active substance, wherein the alloy component is a polyolefin material or a thermoplastic polymer material having reactivity, wherein the dual-active substance is a substance containing a group reactive with the unreacted TPU raw material and a group reactive with the alloy component, and wherein the auxiliary reagent comprises an initiator;

2) controlling a temperature of a reaction zone of the twin-screw extruder at 50° C. to 250° C., and granulating an extruded material by underwater cutting to produce a granulated product; and 3) drying the granulated product obtained in step 2) to obtain the TPU alloy material.

2. The process according to claim 1, wherein the dual-active substance is a compound containing one or more functional group selected from the group consisting of an anhydride group, a carboxyl (—COOH) group, a hydroxyl (—OH) group, an amino (—NH or —NH$_2$) group, an isocyanate group (—NCO) group, and an epoxy group.

3. The process according to claim 2, wherein the dual-active substance is one selected from the group consisting of maleic anhydride, glycidyl methacrylate, acrylic acid, methyl methacrylate, butyl acrylate, acrylamide, allyl polyethylene glycol, amino acid, and epoxy resin.

4. The process according to claim 1, wherein the thermoplastic polymer material having reactivity is one selected from the group consisting of polyamide, acrylonitrile-butadiene-styrene (ABS) resin, thermoplastic elastomer (TPE), and polyacrylate.

5. The process according to claim 1, wherein the polyolefin material is one selected from the group consisting of styrene-ethylene/butylene-styrene copolymer (SEBS), poly(styrene-butadiene-styrene) (SBS), polypropylene (PP), polyethylene (PE), ethylene-vinyl acetate (EVA), polyolefin (POE), and ethylene propylene diene monomer (EPDM).

6. The process according to claim 1, wherein the unreacted TPU raw material comprises a polymeric polyol, a chain extender, and an isocyanate.

7. The process according to claim 6, wherein the polymeric polyol is one or more selected from the group consisting of a polyester polyol, a polyether polyol, and hydroxyl terminated polybutadiene diol, and the chain extender is a small molecule diol or diamine having 12 carbon atoms or less.

8. The process according to claim 6, wherein the chain extender is one or more selected from the group consisting of ethylene glycol, 1,3-propanediol, 1,3-butanediol, 1,4-butanediol, 1,6-hexanediol, 1,4-cyclohexanedimethanol, diethylene glycol, triethylene glycol, neopentyl glycol, and dipropylene glycol; wherein the isocyanate is one or more selected from the group consisting of toluene diisocyanate (TDI), diphenylmethane diisocyanate (MDI), hexamethylene diisocyanate (HDI), dicyclohexylmethane diisocyanate (H12MDI), isophorone diisocyanate (IPDI), and xylylene diisocynate (XDI).

9. The process according to claim 1, wherein the auxiliary reagent further comprises an antioxidant, a lubricant, and an UV-resistant additive.

10. The process according to claim 1, wherein a rotation speed of the screw extruder in step 2) is controlled to be 80 rpm to 400 rpm, and a temperature in a cooling zone is controlled to be at 90° C. to 110° C.

11. The process according to claim 7, wherein the chain extender is one or more selected from the group consisting of ethylene glycol, 1,3-propanediol, 1,3-butanediol, 1,4-butanediol, 1,6-hexanediol, 1,4-cyclohexanedimethanol, diethylene glycol, triethylene glycol, neopentyl glycol, and dipropylene glycol; wherein the isocyanate is one or more selected from the group consisting of toluene diisocyanate (TDI), diphenylmethane diisocyanate (MDI), hexamethylene diisocyanate (HDI), dicyclohexylmethane diisocyanate (H12MDI), isophorone diisocyanate (IPDI), and xylylene diisocynate (XDI).

* * * * *